United States Patent

[11] 3,543,736

[72] Inventors Toshio Suzuki, Nagoya-shi,
Yujiro Oshima, Ichinomiya-shi, and Masao
Kataoka, Nagoya-shi, Japan
[21] Appl. No. 772,732
[22] Filed Nov. 1, 1968
[45] Patented Dec. 1, 1970
[73] Assignee Kabushiki Kaisha Toyota Chuo Kenkyusho,
Nagoya-shi, Aichi-ken, Japan
[32] Priority Nov. 18, 1967
[33] Japan
[31] No. 42/74350

[54] INTERNAL COMBUSTION ENGINE WITH SUB-COMBUSTION CHAMBER
1 Claim, 2 Drawing Figs.

[52] U.S. Cl. ............................................. 123/32,
123/119, 123/122, 123/143; 261/41
[51] Int. Cl. ......................................... F02b 17/00
[50] Field of Search ................................. 123/32,
32(STR), 32(SPA), 75, 119, 122(H), 143(B);
261/41

[56] References Cited
UNITED STATES PATENTS

| | | | |
|---|---|---|---|
| 2,184,357 | 12/1939 | Mallory | 123/32 |
| 2,759,716 | 8/1956 | Jones | 261/41 |
| 2,884,913 | 5/1959 | Heintz | 123/32STR |
| 3,066,661 | 12/1962 | May | 123/143B |
| 3,174,470 | 3/1965 | Von Seggern et al. | 123/32STR |
| 3,213,839 | 10/1965 | Gitlin et al. | 123/119 |
| 3,283,751 | 11/1966 | Goossak et al. | 123/119 |
| 3,456,634 | 7/1969 | Nelson | 123/75 |

OTHER REFERENCES
Project Stratofire-SAE, 485 Lexington Ave. N.Y. 17, N.Y., Paper No. 660094, pages 4-7.

*Primary Examiner*—Laurence M. Goodridge
*Attorney*—Berman, Davidson and Berman

ABSTRACT: An internal combustion engine having a cylinder, including a main combustion chamber, in combination with a subcombustion chamber provided with an ignition plug and communicating with the main combustion chamber through a small hole in a cylinder wall for jetting out the flame of air-fuel mixture ignited in the subcombustion chamber to the main combustion chamber, the air-fuel mixture being supplied to the subcombustion chamber through a suction tube from the same carburetor which feeds the main combustion chamber. The carburetor inlet of said suction tube is positioned between the throttle valves of a carburetor having dual throttle valves. A valve is placed at the outlet of the suction tube to the subcombustion chamber and this valve may be interconnected with a main valve in the suction manifold leading from the carburetor to the main combustion chamber to move in synchronism therewith and with a piston in the cylinder, or it may be arranged to operate automatically in response to the difference of pressure within the subcombustion chamber and the suction tube.

Patented Dec. 1, 1970
3,543,736
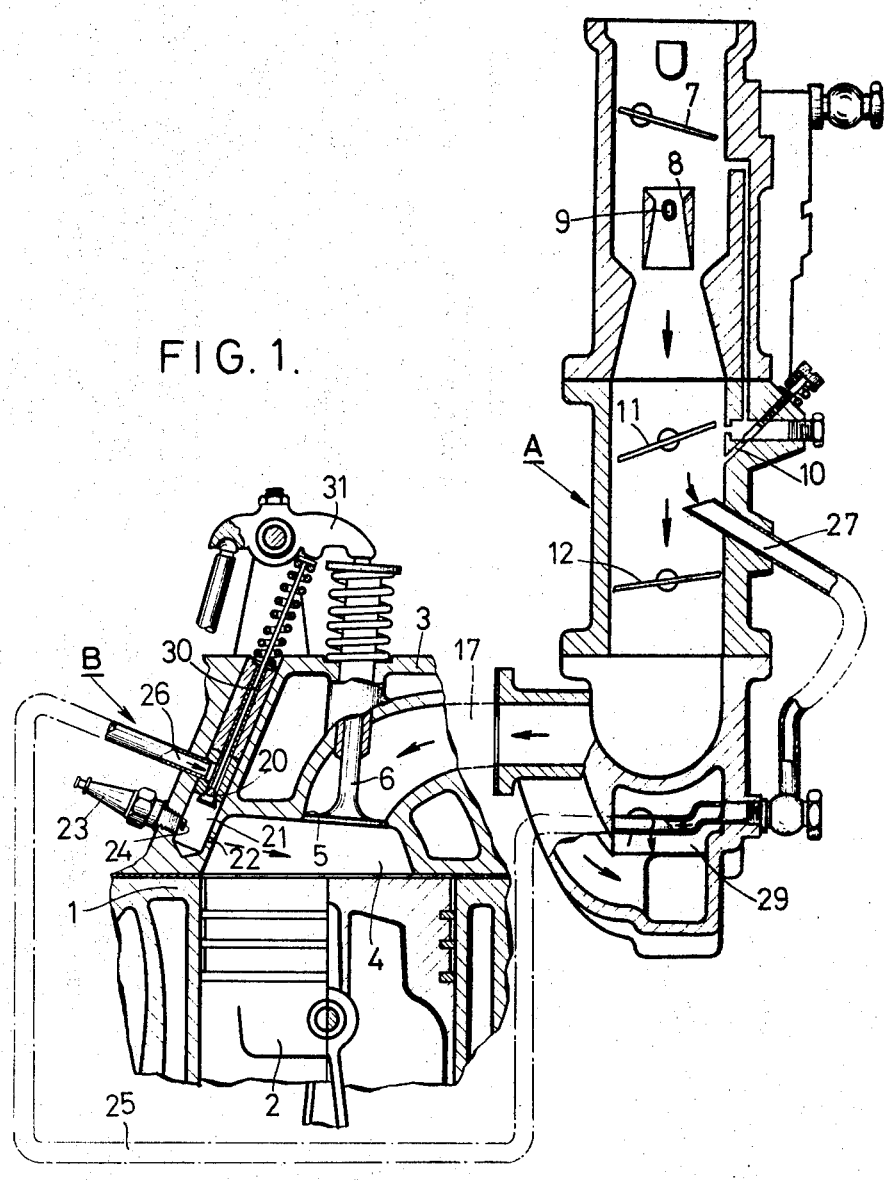
FIG. 1.
FIG. 2.
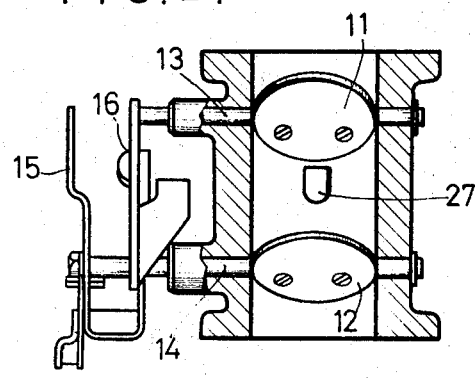
INVENTORS.
TOSHIO SUZUKI,
YUJIRO OSHIMA,
MASAO KATAOKA,
By Berman, Davidson & Berman
ATTORNEYS.

INTERNAL COMBUSTION ENGINE WITH SUBCOMBUSTION CHAMBER

The present invention relates to improvements in an internal combustion engine provided with a main and a subcombustion chamber, the latter being separated from the main combustion chamber by a wall and communicating with the main combustion chamber through a small hole, or holes, so that upon ignition of fuel-air mixture in the subcombustion chamber the resultant flame will jet out into the main combustion chamber and ignite fuel-air mixture therein.

In the most common conventional internal combustion engine, air-fuel mixture is supplied from the carburetor to the combustion chamber formed in the cylinder above the piston, and the mixture is ignited by a spark plug within the combustion chamber to give motion to the piston, but some exhaust gas remains in said chamber even after the piston arrives at the top dead center during the exhaust stroke. Subsequently, air-fuel mixture sucked into the combustion chamber during the suction stroke is diluted by the remaining exhaust gas, particularly when the proportionate amount of inhaled air is reduced in relation to the fuel as the throttle valve in the carburetor is almost closed under no-load running condition. This further reduces the efficiency of combustion by increasing the remaining unburned fuel in the exhaust, and generates injurious components in the exhaust.

Therefore, it has been proposed to modify the engine by adding a subcombustion chamber having a spark plug and a small suction valve to the above mentioned combustion chamber, hereinafter termed the main combustion chamber, and rich air-fuel mixture is sucked from a carburetor to the subcombustion chamber for ignition and burning therein. As a result, the air-fuel mixture in the main combustion chamber, although excessively diluted by residual gas, is burnt by the flame jetted out from the subcombustion chamber into the main combustion chamber.

In the above described modified conventional internal combustion engine, independent carburetors are provided for the main and subcombustion chambers, and since the amount or air-fuel mixture fed into the subcombustion chamber is smaller than the amount fed to the main combustion chamber, the carburetor for the subcombustion chamber must be made considerably smaller than the carburetor for the main combustion chamber. In addition, it is necessary to provide a throttle valve in the smaller carburetor as in the carburetor for the main combustion chamber because the feed of air-fuel mixture must be controlled for meeting various kinds of driving conditions.

Regardless of the change in amount of the air supplied to the subcombustion chamber, it has been necessary to provide a fuel supplying auxiliary carburetor device almost identical with the carburetor for the main combustion chamber, because it is necessary to retain the air-fuel ratio to be always within a proper range and, therefore, it is impossible to avoid complicating the auxiliary carburetor structure if fuel combustion is to be improved.

It is a primary object of the present invention to provide an improved engine construction embodying main and subcombustion chambers which will obviate the defects and disadvantages of conventional engines as briefly outlined above.

It is an important object of this invention to provide an internal combustion engine with a subcombustion chamber and related parts which will improve combustion efficiency and prevent the generation of injurious components in the exhaust gas under any and all driving states and conditions.

It is another important object of this invention to provide an internal combustion engine with subcombustion chamber wherein the air-fuel mixture which is ignited and burned in the subcombustion chamber is supplied from the same carburetor which supplies the main combustion chamber.

A further object of this invention is to provide an internal combustion engine with subcombustion chamber wherein the supply of air-fuel mixture to the subcombustion chamber is properly regulated under any and all driving states.

Yet another object of the invention is to provide an improved internal combustion engine with subcombustion chamber, having the above described characteristics, which is of simple construction, and easy and economical to manufacture and use.

In accordance with the present invention, it is not necessary to provide a separate carburetor for the subcombustion chamber, the air-fuel mixture being introduced into the subcombustion chamber from the same carburetor supplying the main combustion chamber. The mixture is ignited by an ignition plug within the subcombustion chamber to burn therein and the resultant flame is jetted into the main combustion chamber through a small aperture in the wall separating the two chambers. Thus, the structural drawback of providing an additional carburetor in the conventional engine with subcombustion chamber is removed, and at the same time, a proper mix of air and fuel is always supplied from the carburetor which feeds the main combustion chamber. With the new device, it is possible to obtain excellent combustion in any driving state of the engine.

To enable this result in the internal combustion engine of the present invention, air-fuel mixture is fed to the subcombustion chamber by a suction tube leading from the main carburetor to the subcombustion chamber. One end of the tube opens to the interior of the carburetor between its two throttle valves, which are provided downstream of the venturi portion of the carburetor. The other end of the suction tube is connected to the suction opening of the subcombustion chamber. In this manner excellent regulation of fuel-air mixture supplied to the subcombustion chamber is effected, and perfect and uniform subsequent combustion of the mixture gas within the main combustion chamber can be made. The present invention is particularly effective in increased efficiency of combustion under no-load running, the imperfect combustion of the excessively diluted mixture gas within the main combustion chamber being completely avoided and the generation of injurious components of the exhaust gas being prevented.

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several FIGS. and in which:

FIG. 1 is a sectional diagram illustrating an embodiment of the invention;

FIG. 2 is a fragmentary sectional diagram showing a portion of the carburetor of FIG. 1 in a plane at right angle to the view of FIG. 1;

Referring now more particularly to the drawings, and in the embodiment as shown in FIGS. 1 and 2, A generally represents the carburetor and B the upper portion of the cylinder provided with the subcombustion chamber. The carburetor is connected to the upper portion 4 of the combustion chamber above the piston 2 within the cylinder 1, by suction manifold 17, and the carburetor A and the subcombustion chamber 21 are connected by a suction tube 25.

In the internal portion of the cylinder head 3, fixed on the upper portion of the cylinder 1, the main combustion chamber 4 is formed between the cylinder head and the upper surface of the piston 2 which reciprocates within the cylinder 1, and the air-fuel mixture supplied by the carburetor A is sucked through the opening 5 at the end of the manifold 17.

Opening 5 is opened or closed by the valve 6 whose stem protrudes above the cylinder head and bears against one end of a pivoted rocker arm 31, the other end of which is interconnected through a conventional mechanism with the piston 2 and regulates the amount of the air-fuel mixture sucked into the main combustion chamber. Valve 6 is resiliently biased closed by the unnumbered spring shown, said bias being overcome on downward movement of the right end of rocker arm 31.

The main nozzle 9 of the carburetor A, for supplying fuel from the fuel source into the venturi portion 8 downstream of the choke valve 7, is opened and the primary throttle valve 11 and the secondary throttle valve 12 which are respectively interconnected and move together in response to the operation of the accelerator pedal, are provided downstream of said main nozzle 9.

The opening of the primary throttle valve 11 is adjusted to be slightly larger than the opening of the secondary throttle valve 12. These valves are respectively rotated by shafts 13 and 14 and interconnected by connecter 16 to the throttle lever 15 controlled by the accelerator pedal, not shown.

Passage 10 for supplying fuel during low speed drive opens to the internal wall of the carburetor just below the primary throttle valve 11, and one end 27 of the suction tube 25 for supplying the air-fuel mixture into the subcombustion chamber 21, opens into the carburetor bore between the valves 11, 12 and just downstream of passage 10.

The subcombustion chamber 21 has inserted therein the igniting spark plug 23 including electrode 24 which is energized in a conventional way by a source of electricity and ignition current (not shown). Chamber 21 is integrally formed in a sidewall of the cylinder head 3, the subcombustion chamber 21 and the main combustion chamber 4 being connected by the small hole, or holes, 22 through the wall separating them.

The subcombustion chamber 21 has a suction opening 20 for inlet of air-fuel mixture supplied through the suction tube 25, one end 27 of the suction tube 25 opening within the carburetor as previously explained, and the other end 26 thereof opening through an outer sidewall of the subcombustion chamber 21. Suction tube 25 passes through the exhaust manifold 29 connected to the main combustion chamber. The said suction opening 20 is compulsorily opened and closed, synchronizing with the suction valve 6 of the main combustion chamber by means of the resiliently biased-to-close valve 30 whose protruding stem bears against the same end of rocker arm 31, but closer to its pivot so as to be proportionately moved to open in interconnected fashion with main valve 6.

The above described device operates in the following manner: When the internal combustion engine is operated in slow drive, the opening of the primary throttle valve 11 is small, and the secondary throttle valve 12 is almost totally closed. Fuel is jetted from the passage 10 to the end 27 of the suction tube 25. During the suction stroke, the valve 6 of the main combustion chamber is opened, and the piston 2 is lowered within the cylinder 1 to suck the air-fuel mixture into the cylinder, but since the secondary throttle valve 12 is almost totally closed, the pressure within the main combustion chamber is lowered. At the same time, the rich fuel-air mixture from the passage 10 is sucked into the end 27 of the suction tube 25, provided just below said passage 10, and flows into the subcombustion chamber 21 because the suction valve 30 opens as a result of movement of rocker arm 31. The pressure of the fuel-air mixture in the subcombustion chamber is raised higher than that of the fuel-air mixture within the main combustion chamber 4, and, therefore, the exhaust gas remaining within the subcombustion chamber 21 is driven out into the main combustion chamber 4. The fuel-air mixture in chamber 21 is, therefore, relatively undiluted by exhaust gas, and is ignited by the electrode 24 of the ignition plug to burn perfectly, the flame being jetted out from the small hole 22 into the main combustion chamber 4. The ignition energy of this flame is great, and consequently, the fuel mixture in the main combustion chamber 4, even though excessively diluted by exhaust gas, is burned perfectly.

During full load drive condition most of the fuel-air mixture is sucked into the main combustion chamber 4 because both the primary throttle valve 11 and the secondary throttle valve 12 are fully open. The fuel-air mixture within the main combustion chamber 4 flows into the subcombustion chamber 21 through the small hole 22 because of the higher pressure in the main chamber. The ignition plug again ignites the mixture in the subcombustion chamber and the flame is convectionally jetted into the main combustion chamber 4 to burn the fuel therein. Since the amount of the fuel-air mixture sucked into the main combustion chamber 4 is great, the remaining exhaust gas is proportionately small and has little effect. Thus, combustion takes place, ignited by the flame from chamber 21 through opening 22, perfectly and uniformly.

Under part load condition, the primary throttle valve 11 is half opened, and the secondary throttle valve 12 is somewhat less opened than the primary throttle valve. The amount of the fuel-air mixture to be sucked into the subcombustion chamber 21 through the suction tube 25 is determined by the difference of the pressure of the gas within the suction tube 25 and within the suction manifold 17 in accordance with the opening or setting of the secondary throttle valve 12. The fuel in the subcombustion chamber 21 is ignited in the same manner as explained for the preceding two instances, the fuel-air mixture within the main combustion chamber 4 being ignited by the flame issuing from within the subcombustion chamber 21 and then burning completely and perfectly.

In the foregoing embodiment, the opening of the primary throttle valve is a little larger than the opening of the secondary throttle valve, but instead the two throttle valves can be arranged to open to the same degree.

Because the suction tube 25 for the subcombustion chamber is passed through the exhaust manifold 29, the fuel-air mixture supplied into the subcombustion chamber 21 is preheated, and the combustion within the subcombustion chamber 21 is thus accelerated.

During condition of full load running, the amount and the pressure of the mixture to be supplied to the main combustion chamber 4 through manifold 17 are increased and, therefore, the automatic suction valve 30' of the subcombustion chamber 21 is not opened, and no, or very little fuel-air mixture passes into the subcombustion chamber 21 from tube 25, but the fuel mixture under high pressure in the main combustion chamber 4 is jetted into the subcombustion chamber 21 through opening 22, and is ignited and burned therein, the flame being jetted back out into the main combustion chamber to ignite the fuel mixture therein.

The suction valve of the subcombustion chamber can be either an automatic valve operated by the difference of pressures at the inlets to the main and subcombustion chambers, or a valve interlocked to compulsorily open and close with the main valve 6 regardless of the carburetor construction.

It will be apparent that the invention functions to carry out perfect and uniform combustion, and especially when the fuel-air mixture in the main combustion chamber is lean, or when it is excessively diluted by remaining exhaust gas tending to cause imperfect combustion, as in lo-load running. In this invention, the air-fuel mixture supplied to the subcombustion chamber is properly regulated so as to quickly ignite and burn with great intensity, and its flame is jetted out into the main combustion chamber to carry out the perfect combustion.

Moreover, in accordance with the present invention, air-fuel mixture is supplied to the subcombustion chamber from the same carburetor which supplies mixture to the main combustion chamber, and, therefore, the structure is simple, yet the mixture supplied to the subcombustion chamber is readily adjusted and regulated in accordance with the driving state by normal operation of the carburetor throttle.

Thus, when the present invention is employed, improved economy of fuel and the reduction of injurious components contained in the exhaust gas can be obtained.

Although a certain specific embodiment of the invention has been shown and described, it is obvious that many modifications thereof are possible. The invention, therefore, is not intended to be restricted to the exact showing of the drawings and description thereof, but is considered to include reasonable and obvious equivalents.

We claim:

1. An internal combustion engine having, in combination, a main combustion chamber in a cylinder communicating with a manifold, a subcombustion chamber separated from said cylinder by a wall, said subcombustion chamber communicating with said main combustion chamber by at least one small opening in said wall and having an ignition plug for igniting fuel-air mixture therein, a carburetor connected to said cylinder by the manifold for feeding fuel-air mixture thereto and having a main nozzle for supplying fuel from a fuel source, and a tube for passage of fuel-air mixture connecting said carburetor to said subcombustion chamber, said carburetor being provided with spaced primary and secondary throttle valves and a passage for supplying fuel during slow speed drive, the primary throttle valve being positioned upstream of said passage, the secondary throttle valve being positioned downstream of said primary throttle valve and said pair of throttle valves being operated in interconnected fashion with each other, one end of said tube opening into said carburetor at a position between said pair of throttle valves and just below said passage for supplying fuel to receive fuel jetted from said passage when the secondary throttle valve is almost totally closed, and the other end of said tube having an outlet to the subcombustion chamber controlled by a suction valve.